Figure 1:
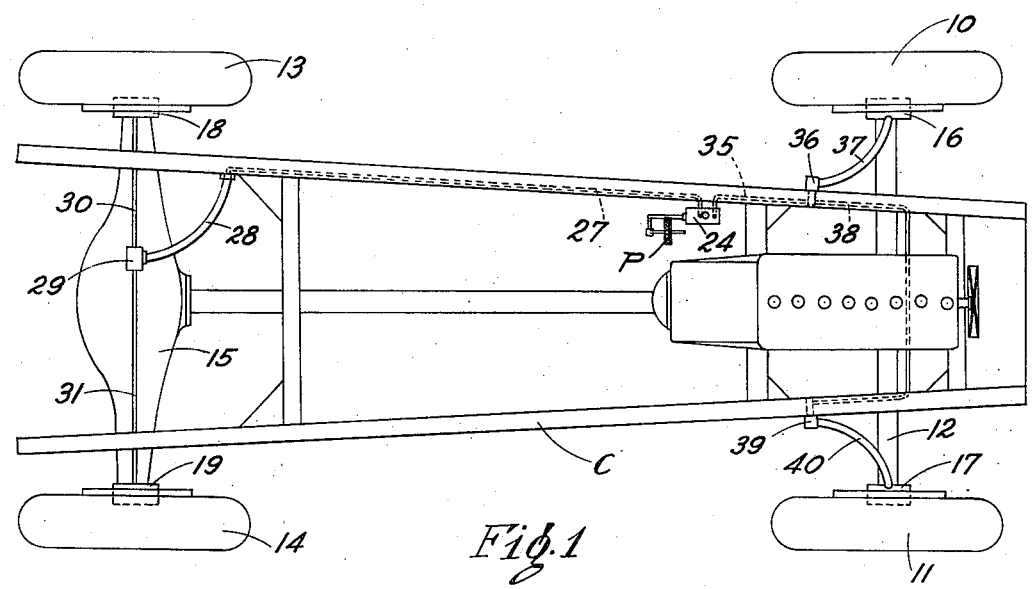

May 9, 1939.  W. C. SESSIONS  2,157,733
BRAKE
Filed Feb. 7, 1935  2 Sheets-Sheet 1

Inventor
WILLIAM C. SESSIONS
By
Attorneys

May 9, 1939. W. C. SESSIONS 2,157,733
BRAKE
Filed Feb. 7, 1935 2 Sheets-Sheet 2
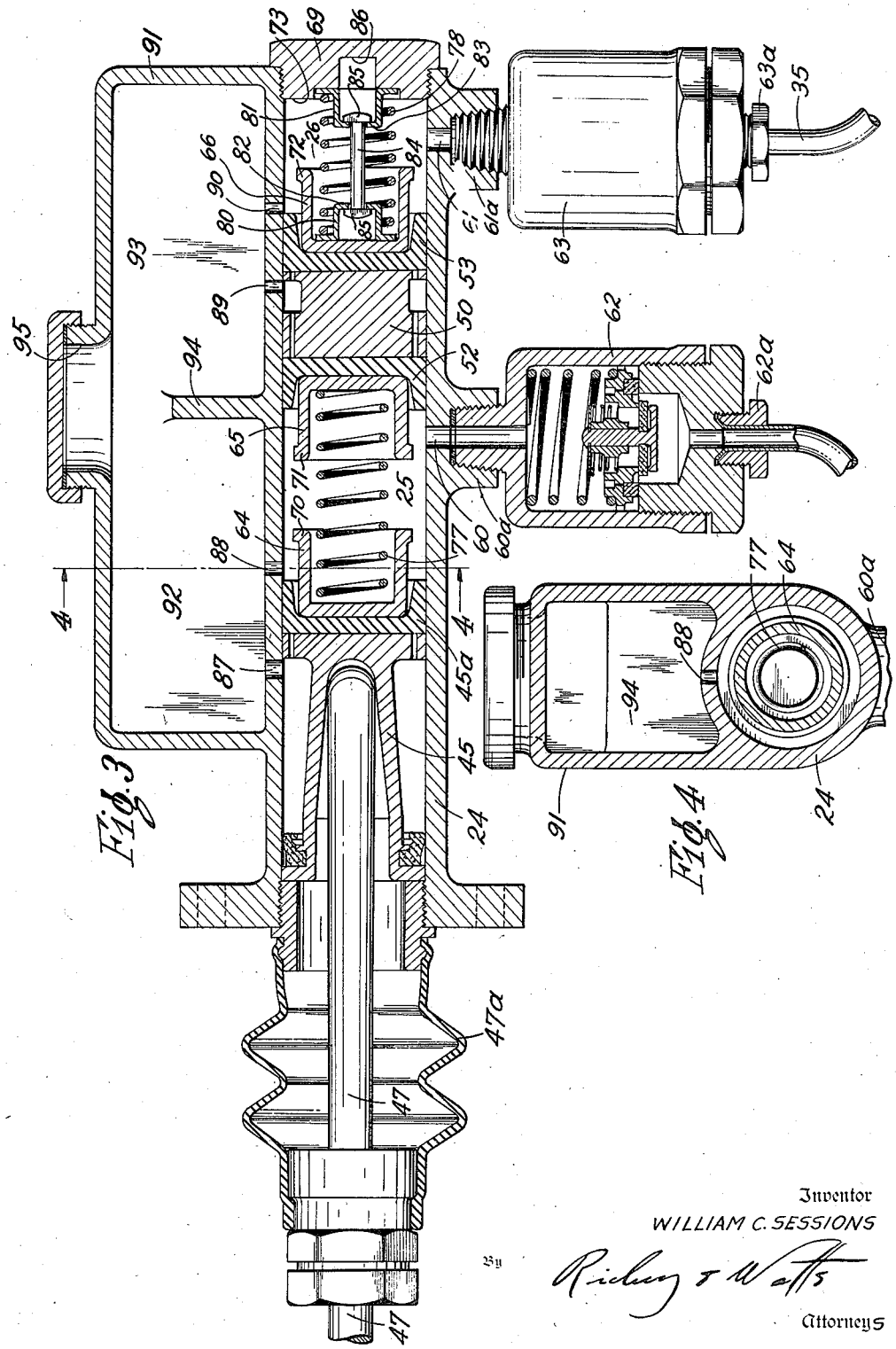
Inventor
WILLIAM C. SESSIONS
By Richard T Watts
Attorneys Patented May 9, 1939

2,157,733

UNITED STATES PATENT OFFICE 2,157,733

BRAKE

William C. Sessions, Lakewood, Ohio, assignor to
The Weatherhead Company, Cleveland, Ohio,
a corporation of Ohio Application February 7, 1935, Serial No. 5,434

18 Claims. (Cl. 60—54.5)

This invention relates to brakes and more particularly to fluid actuating systems for motor vehicle brakes.

In conventional types of hydraulic vehicle brakes now widely used, the actuating fluid is supplied by a master cylinder having a piston therein connected to the brake operating pedal. The fluid is distributed through suitable metallic tubing and flexible connections to wheel cylinders which are provided with pistons connected to the brake shoes, and upon application of pressure to the brake pedal the fluid pressure produced in the master cylinder is transmitted to the wheel cylinders causing the pistons in the wheel cylinders to expand the brake shoes into engagement with the brake drums. In the conventional system, a single master cylinder is employed with the result that a failure anywhere in the fluid system will cause a loss of fluid pressure throughout the system and the consequent failure of all of the brakes.

It is among the objects of my invention to provide a fluid pressure braking system embodying separate fluid systems, separately associated with one or more of the brake actuating cylinders and arranged so that the failure of one fluid system will not affect any brakes not associated with that particular system. Another object of my invention is to provide a system wherein the pressures developed in the separate fluid systems are automatically maintained in predetermined relationship by hydraulic means under normal conditions of brake operation but wherein the failure of fluid pressure in one of the separate systems will not prevent operation of brakes associated with another separate system. Another object of my invention is to provide a system having a master cylinder divided into two chambers and wherein the pressures in the two chambers are hydraulically substantially equalized without requiring any mechanical equalization means. Another object of my invention is to provide a master cylinder having a main actuating piston and a floating secondary piston therein dividing the master cylinder into separate chambers, there being separate fluid lines leading from the separate chambers to individual brakes or pairs of brakes on the vehicle. Another object is to provide a master cylinder having a main actuating piston and a floating secondary piston for substantially equalizing the fluid pressures between the two chambers and mechanical means for positively actuating the floating piston in the event of failure of fluid pressure between the main piston and the secondary piston. Another object of my invention is to provide a master cylinder embodying the advantages outlined above which can be constructed easily with a minimum of expense and which can readily be adapted to hydraulic braking systems now in use. Another object is to provide such a master cylinder assembly which embodies a minimum of moving parts. Another object of my invention is to provide a system wherein the air or other gases in the respective chambers of the master cylinder can be readily vented, and the fluid supply in each of the chambers can be properly maintained. Another object is to provide an extremely safe hydraulic brake system of simple, rugged, and fool-proof construction.

Figure 2:
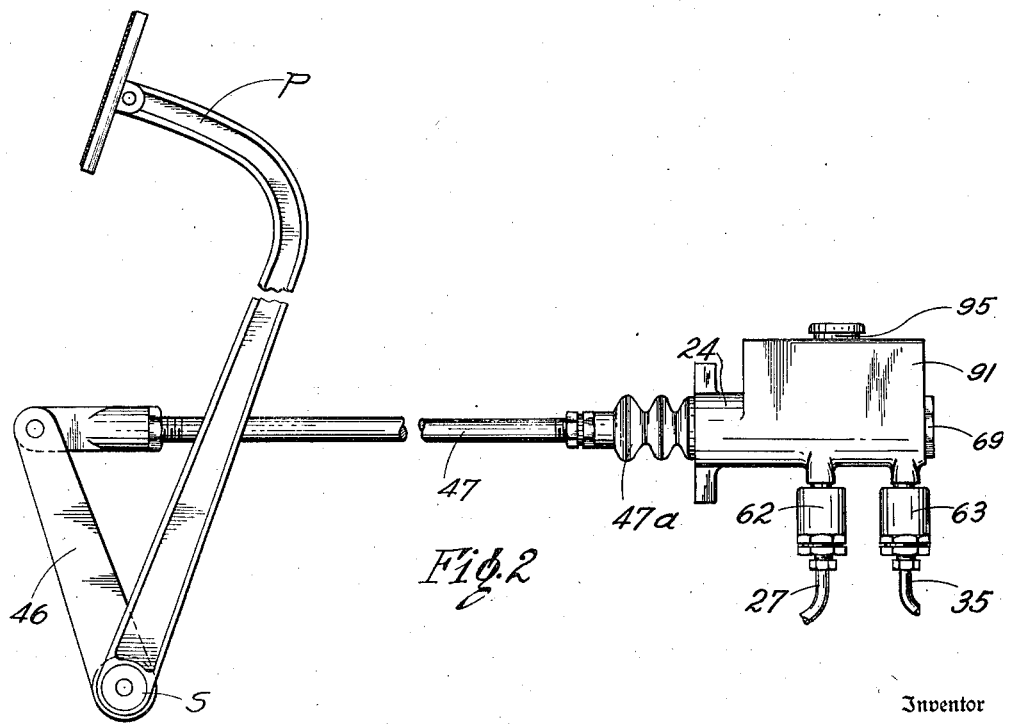

Further objects and advantages of my invention will be apparent from the following description of a preferred form thereof, reference being made to the accompanying drawings, wherein:

Figure 1 is a diagrammatic plan view of the chassis of a motor vehicle embodying my invention; Figure 2 is a side elevation of the master cylinder illustrating the actuating pedal and connecting linkage; Figure 3 is a vertical section on an enlarged scale showing the master cylinder and associated mechanism; and Figure 4 is a transverse vertical section taken along line 4—4 of Figure 3.

In the drawings, I have illustrated a preferred form of my invention as applied to a conventional motor vehicle. The chassis frame of an automobile is indicated generally at C, the front wheels 10 and 11 being mounted on a conventional axle 12, and the rear wheels 13 and 14 likewise being mounted on a conventional axle 15. Each of the wheels is provided with a brake of any ordinary type, the front wheel brakes being actuated by pistons within the cylinders 16 and 17, respectively, and the rear wheel brakes being actuated by pistons within the cylinders 18 and 19, respectively.

In order to provide separate braking systems for the front and rear wheels so that a failure in the braking system connected to either the front or rear wheels will not prevent proper operation of the brakes for the remaining pair of wheels, the master cylinder 24 is preferably divided into two chambers 25 and 26. The fluid pressure generated in chamber 25 may be conducted through suitable fluid conduits such as the metallic tubing 27, a flexible hose 28, the T-connection 29, the metallic tubes 30 and 31 to the rear wheel cylinders 18 and 19, respectively, while the fluid pressure generated in cylinder 26 may be conducted through conduits such as the metallic tube 35, fitting 36, the flexible hose 37 to wheel cylinder 16 and through the metallic tube 38, the fitting 39 and flexible hose 40 to cylinder 17. By this arrangement, the two chambers are associated with independent braking systems so that the failure of one braking system will not result in a failure of the other braking system so long as it is possible to produce the required actuating pressures within that chamber of the master cylinder which is associated with the fluid system which remains intact.

Obviously, the loss of fluid pressure in one of the fluid conducting systems will result in a corresponding loss in fluid pressure in the chamber of the master cylinder which is associated with that fluid system. In order to make it possible to develop the necessary actuating pressures in one chamber regardless of the loss of actuating pressure in the other chamber, while obtaining substantial equalization of pressures under all normal conditions, I preferably employ a master cylinder embodying a main piston 45 and a floating or secondary piston 50. The fluid pressures in the master cylinder 24 are primarily developed by the main piston 45 which may be of conventional construction and which may be actuated by the brake pedal P through the lever 46 mounted on the shaft S and connected to the connecting rod 47. The piston may be provided with the usual rubber sealing cup 45a while the connecting rod preferably extends through the usual rubber dust boot 47a. The master cylinder, brake pedal, and associated linkage may be mounted in the chassis in any convenient manner, as will be well understood by those skilled in the art.

When the brake pedal is depressed in the usual manner, fluid pressure will be built up ahead of piston 45 within the cylinder and particularly within the chamber 25. The fluid pressure built up ahead of piston 45 will in turn be transmitted to the floating piston 50 which divides the cylinder into the chambers 25 and 26 and which is preferably provided with oppositely extending rubber sealing cups 52 and 53 to prevent transmission of fluid in either direction between the chambers 25 and 26. The pressure within the chamber 25 on piston 50 will cause it to move in the same direction as the main piston 45 until the fluid pressure within the chamber 26, acting on piston 50, balances the fluid pressure in chamber 25. In the preferred embodiment illustrated in the drawings, the areas on both sides of the piston 50 are equal, and thus, if the effect of friction and the springs be disregarded, the piston will always move a sufficient amount to maintain equal fluid pressures in the chambers 25 and 26. However, it will be apparent to those skilled in the art that the chambers 25 and 26 could be made of unequal diameters, and the areas on the opposite sides of piston 50 correspondingly unequal, in which case the piston would function to maintain a predetermined ratio between the fluid pressures in the respective chambers.

Fluid under pressure from the chambers 25 and 26 may, as illustrated particularly in Figure 3, be conducted through the ports 60 and 61, respectively, formed in suitable projecting bosses 60a and 61a in the lower wall of the cylinder 24. Preferably the outlet ports are provided with the usual check valves located within suitable casings 62 and 63, for maintaining a certain amount of fluid pressure in the lines leading to the respective brakes. The check valves may be of well known construction and will not be described further herein as the details of the valves per se form no part of the present invention. The casings 62 and 63 may be connected respectively to the tube 27 leading to the rear wheel brakes and the tube 35 leading to the front wheel brakes by any suitable tube fittings 62a and 63a.

It will be seen that by my arrangement embodying the floating secondary piston 50, the fluid pressures developed in the chambers 25 and 26 will always be substantially equalized regardless of normal variations in the amount of fluid flow to the respective brake cylinders required to build up the necessary pressures for varying amounts of flow will be automatically compensated for by the floating action of the secondary piston 50. Under ordinary circumstances, assuming that the wheel cylinders of the front and rear brakes are of the same diameter, that the brakes are properly adjusted, and that there has been no substantial wear on the brake shoes, the same amount of fluid will be displaced from cylinders 25 and 26 to build up equal operating pressures in their respective wheel cylinders.

Under these ideal conditions, the travel of the piston 50 within the cylinder will be half the travel of the main piston 45, resulting in equal changes in volume in the chambers 25 and 26. Thus in case the maximum stroke of the piston 45 is an inch and a quarter, for example, then if the pedal is depressed to its greatest extent and the piston 45 moved an inch and a quarter, the piston 50 will move half that distance or five-eighths of an inch. Because of the movement of the piston 50 away from the piston 45, the net result of the movement of the pistons on chamber 25 is a reduction in length of the chamber of five-eighths of an inch. The length of chamber 26 is likewise reduced by five-eighths of an inch by the five-eighths inch stroke of the piston 50. For shorter strokes of piston 45, the stroke of piston 50 will be correspondingly shorter, and if, as frequently occurs in service, one set of brake shoes becomes worn more than another or if for any other reason one of the fluid systems requires more fluid than the other for developing equal pressures, the stroke of the secondary piston 50 will be varied accordingly, as that piston will always function to equalize the pressure developed in the chambers 25 and 26.

To prevent the failure of fluid pressure and corresponding loss of pressure in one of the chambers 25 and 26 from resulting in a failure of fluid pressure in the other chamber, I preferably provide a cup-shaped stop member 64 mounted on the piston 45 and oppositely extending cup-shaped stop members 65 and 66 mounted on opposite sides of the piston 50.

The cups 64 and 65 are provided with flanged ends 70 and 71 which are adapted to engage each other as soon as the pistons have moved a distance relative to each other corresponding to their maximum effective stroke. In a similar manner, the flanged end 72 of the cup 66 is adapted to engage the plug 69 after piston 50 has moved a distance corresponding to its effective stroke toward the end of the cylinder. Thus, in the example shown in the drawings and described above, the ends 70 and 71 of the cups 64 and 65 are normally spaced five-eighths of an inch apart when the piston 45 is in retracted position, as the maximum effective relative movement between piston 45 and piston 50 is five-eighths of an inch or one-half of the maximum stroke of piston 45. In a similar manner of the example shown, the flanged end 72 of cup 66 is spaced a distance of five-eighths of an inch from the inner surface 73 of the plug 69, as the maximum effective stroke of piston 50 within the chamber 26 is five-eighths of an inch.

By reason of these stops it will be seen that upon failure of the fluid pressure system associated with chamber 26 and the consequent loss of fluid pressure in that chamber, actuation of the main piston 45 and the development of fluid pressure in chamber 25 will cause the secondary piston to move substantially the same distance as piston 45 by reason of the high pressure within chamber 25 and the lack of pressure or low pressure within chamber 26. This movement will continue until the flanged end 72 of cup 66 strikes the surface 73 of plug 69. Assuming that there was no back pressure in chamber 26, the piston 50 would engage the stop and be prevented from further movement as soon as piston 45 had moved five-eighths of an inch from its retracted position or one-half of the maximum possible movement of that piston. When this has taken place further movement of piston 45 will result in immediate building up of fluid pressure within the chamber 25, and before the brake pedal reaches the floor, the piston 45 can be moved another five-eighths of an inch, which movement, because of the fact that piston 50 acts as a solid wall, is effective entirely to displace fluid from the chamber 25 and build up the actuating pressures in the wheel cylinders associated with that chamber. Thus it will be seen that failure of fluid pressure in chamber 26 does not impair in any way the effectiveness of the fluid pressure system associated with chamber 25, and does not reduce the effective stroke of piston 45.

In the event of failure of the fluid system associated with chamber 25 and the consequent loss of fluid pressure within chamber 25, movement of piston 45 will not cause any considerable movement of piston 50 because of the fluid pressure within the chamber 26 exerted upon piston 50. However, as soon as piston 45 has been moved for half of its stroke or five-eighths of an inch in the example given herein, the flanged ends 70 and 71 of cups 54 and 65 will engage each other, and thereafter the piston 50 will move as a unit with piston 45 and retain its normal five-eighths of an inch maximum stroke, which will be entirely unaffected by the failure of fluid pressure in chamber 25.

The fact that the effective stroke of the respective pistons in my system is unimpaired by a failure in one part of the system is an important feature of my invention, for frequently operators of motor cars neglect to have their brakes adjusted until the brake pedal nearly reaches the floor of the car in ordinary operation, which indicates that each application of the brake involves nearly the full travel of the piston in the master cylinder. If a failure should occur under such conditions, it is essential that the full braking stroke be retained for that part of the system which remains intact.

In some types of present day motor cars embodying hydraulic brakes, the wheel cylinders associated with the front wheel brakes are of larger diameter than the wheel cylinders associated with the rear wheel brakes in order to give more effective braking on the front wheel, because of the additional weight or load imposed on the front wheels, particularly during brake application. In such a system the front wheel braking system will require a greater amount of fluid than the rear wheel braking system. My brake cylinder can be adapted to take care of this situation merely by varying the position of the ports 60 and 61 and the lengths of the stop members 64, 65 and 66 to allow a greater or less travel of the piston 50, depending upon whether the front wheel brakes are associated with the chamber 26 or the chamber 25. If the larger brake cylinders are connected to chamber 26 the piston 50 will require a greater amount of travel to discharge the greater amount of fluid required by the larger cylinders, while if the larger brake cylinders are associated with chamber 25 a greater amount of relative movement between the pistons will take place. The distance of effective travel of the respective pistons should be in proportion to the areas of the pistons within the respective wheel cylinders.

In order to assist in returning piston 45 to its retracted position and to accurately locate piston 50 in its retracted or normal position, I have provided centering or retracting springs 77 and 78 which also function to retain the cups or stop members 64, 65 and 66 in engagement with the rubber sealing cups and to hold the rubber sealing cups in position against their respective pistons. The spring 77 acts between the cups 64 and 65, while the spring 78 acts between the cup 66 and the plug 69. Preferably the spring 78 is slightly stronger than the spring 77 and is provided with a limiting mechanism, which, as shown in the drawings, may comprise oppositely extending hollow stampings 80 and 81 engaging the opposite ends of the spring. The stampings are provided with portions 82 and 83, respectively, which project within the spring 78 and which are apertured to receive a slidably mounted pin 84 having enlarged end portions 85. The plug 69 is counterbored as at 86 in order to allow for movement of the pin upon brake actuation. It will be seen that by this arrangement the expansion of the spring is limited by the pin 84 so that the spring 85 can not move the piston beyond the normal retracted position as shown in the drawings. As the spring 78 is somewhat stronger than the spring 77, the piston will always be moved back to its normal position, and in normal position the spring 77 will function to hold the piston in engagement with the spring 78 and its associated mechanism.

To provide for venting the system of air, and for replenishing the fluid within the system, vents 87 and 88 are preferably provided in the wall of chamber 25 adjacent piston 45 when it is in retracted position, and similar vents 89 and 90 are provided in chamber 26. These vents lead into a reservoir 91, adapted to contain a supply of actuating fluid. The reservoir 91 is preferably divided into compartments 92 and 93 by a partition 94 disposed directly beneath the filler opening 95 so that fluid poured into the opening may flow into both compartments. By this arrangement, separate fluid supplies are maintained for the two chambers of the master cylinder, so that even in the event of failure of the fluid system associated with one chamber of the master cylinder, the other chamber will be assured of an adequate fluid supply.

From the foregoing description of a preferred form of my invention it will be seen that I have provided a hydraulic brake system wherein failure of part of the system cannot result in complete failure of the braking system. By my master cylinder arrangement hydraulic pressures may be maintained in a predetermined relationship to each other under all normal conditions. My master cylinder is of simple, compact construction, can be manufactured at low cost, and may readily be adapted to present day braking systems without requiring any great change in the general design of the system. My master cylinder can be adapted for various types of brakes, and can be arranged always to equalize the fluid pressures between the various parts of the system regardless of varying amounts of fluid required by the different parts either due to different sizes of cylinders or due to maladjustment of the brakes, wear of the brake shoes, expansion of the fluid lines, or various other causes well known to those skilled in the art. Because of its simplicity and sturdiness, my system is extremely safe under all conditions, and is practically fool-proof.

No special venting arrangement is required in my system as the air may be vented from the master cylinder and the actuating fluid replenished by a simple reservoir disposed directly above the master cylinder in the usual manner, while the reservoir is divided into separate compartments in order to prevent loss of the entire fluid supply upon failure of part of the system.

In the foregoing specification I have described a preferred form of my invention as applied to one type of vehicle brake. Various modifications and changes and different adaptations of my invention will be apparent to those skilled in the art. It is therefore to be understood that my invention is not limited to the preferred form disclosed herein, or in any manner other than by the scope of the appended claims when given the range of equivalents to which my patent may be entitled.

I claim:

1. A fluid pressure braking system comprising in combination a plurality of brakes and wheel cylinders for actuating each of said brakes, means for supplying fluid under pressure to said wheel cylinders comprising a master cylinder comprising a plurality of chambers of uniform diameter, independent connections between said chambers and different wheel cylinders, manually controllable means for developing fluid pressures within said cylinder, and movable means separating said chambers for preventing the transmission of fluid between said chambers and for substantially equalizing the fluid pressures developed within said chambers, and means for limiting the movement of said movable means to a distance equal to substantially half the maximum normal movement of said manually controllable means.

2. A fluid pressure braking system comprising in combination a plurality of brakes and wheel cylinders for actuating each of said brakes, master cylinder means for supplying fluid under pressure to said wheel cylinders, said master cylinder means having two chambers of uniform diameter therein, separate connections leading from said chambers to different wheel cylinders, manually controllable means within one of said chambers for developing fluid pressure therein, and movable means subjected to the fluid pressures in both said chambers for preventing the transmission of fluid between said chambers, said movable means being movable with relation to said manually controllable means, and mechanical means engageable after relative movement equal to substantially half the maximum movement of said manually controllable means, has taken place for preventing further relative movement between said manually controllable means and said movable means.

3. A fluid pressure braking system comprising in combination a plurality of brakes, and wheel cylinders for actuating each of said brakes, means for supplying fluid under pressure to said wheel cylinders comprising a single master cylinder of substantially uniform bore throughout its length, a main piston operable within said cylinder to develop fluid pressure therein, an imperforate secondary piston within said cylinder aligned with said main piston and spaced therefrom to divide said cylinder into two separate chambers, said secondary piston being subjected to the fluid pressures developed in each of said chambers and movable with respect to said main piston and with respect to said cylinder under the influence of said fluid pressures substantially to equalize the fluid pressures in said chambers, means for limiting the movement of said secondary piston with respect to said cylinder whereby the main piston can be actuated to discharge substantially the normal volume of fluid from the chamber between said main and secondary pistons regardless of loss of fluid pressure in the other of said chambers, and fluid connections from one of said chambers to at least one of said wheel cylinders and independent connections from the other of said chambers to at least one other of said wheel cylinders.

4. A fluid pressure braking system comprising in combination a plurality of brakes, and wheel cylinders for actuating each of said brakes, means for supplying fluid under pressure to said wheel cylinders comprising a single master cylinder of substantially uniform bore throughout its length, a main piston operable within said cylinder to develop fluid pressure therein, a secondary piston within said cylinder and spaced from said main piston to divide said cylinder into two separate chambers, one chamber being between said main and secondary pistons, the other chamber being ahead of said secondary piston, said secondary piston being subjected to the fluid pressures developed in each of said chambers and movable with respect to said main piston under the influence of said fluid pressures to equalize the fluid pressures in said chambers, means for limiting the movement of said secondary piston with respect to said primary piston to insure discharge of fluid from the chamber ahead of said secondary piston, means for limiting the movement of said secondary piston with respect to said cylinder to insure discharge of fluid from the chamber between said pistons, and fluid connections from one of said chambers to at least one of said wheel cylinders and independent connections from the other of said chambers to at least one other of said wheel cylinders.

5. In combination, in a fluid pressure braking system, a plurality of brakes and wheel cylinders actuating each of said brakes, a master cylinder having a single straight bore of uniform diameter throughout substantially its entire length, a primary piston operable in said cylinder to develop fluid pressure therein, actuating means for said primary piston, a floating piston movable in said cylinder upon actuation of said primary piston and adapted to divide said cylinder into two fluid pressure chambers, one of said chambers being in front of said floating piston and the other of said chambers being behind said floating piston, independent connections from said chambers to different wheel cylinders, means for limiting the travel of said floating piston with relation to said cylinder to insure discharge of fluid from the chamber behind said floating piston, means for limiting the travel of said floating piston with relation to said primary piston to insure discharge of fluid from the chamber ahead of said floating piston, and spring means for returning said floating piston to its original position within said cylinder after actuation of said primary piston.

6. A fluid pressure braking system comprising in combination a plurality of brakes and wheel cylinders actuating each of said brakes, a master cylinder having a single straight bore of uniform diameter throughout substantially its entire length, a primary piston operable in said cylinder to develop fluid pressure therein, a floating piston operable in said cylinder and adapted to divide said cylinder into two fluid pressure chambers, one of said chambers being in front of said floating piston and the other of said chambers being behind said floating piston, independent connections from said chambers to different wheel cylinders, means for limiting the travel of said floating piston to a distance equal to substantially half the stroke of the primary piston and means for returning said floating piston to normal position upon return of said primary piston to normal position.

7. In combination, in a fluid pressure braking system, a plurality of brakes and wheel cylinders actuating each of said brakes, a master cylinder having a single straight bore of uniform diameter throughout substantially its entire length, a primary piston operable in said cylinder to develop fluid pressure therein, a floating piston operable in said cylinder and adapted to divide said cylinder into two fluid pressure chambers, one of said chambers being in front of said floating piston and the other of said chambers being behind said floating piston, independent connections from said chambers to different wheel cylinders, and stop means for limiting the travel of said floating piston with relation to said cylinder to insure discharge of fluid from the chamber behind said floating piston, and another stop means operable after a predetermined amount of relative movement between said pistons for causing said floating piston to move in unison with said primary piston to insure discharge of fluid from the chamber ahead of said floating piston.

8. A fluid pressure braking system comprising in combination a plurality of brakes, and wheel cylinders for actuating said brakes, master cylinder means for supplying fluid under pressure to said wheel cylinders, a primary piston operable within said master cylinder means to develop fluid pressure therein, a floating secondary piston of the same diameter as the primary piston adapted to divide said master cylinder means into two separate chambers, said secondary piston being subjected to the fluid pressures developed in each of said chambers and movable under the influence of said fluid pressures to transmit the pressure of fluid in one chamber to the fluid in the other chamber, and mechanical means within the fluid system of said master cylinder means for positively moving said floating secondary piston after relative movement substantially equal to half the maximum normal stroke of said primary piston has taken place between said primary and secondary pistons.

9. In a hydraulic braking system a master cylinder having a single aligned bore of uniform diameter, a floating piston therein having a projection formed thereon and dividing the cylinder into two chambers, one of which is connected to one brake and the other of which is connected to another brake, an actuating piston in said cylinder having a projection which may contact the first named projection so that the actuating piston may drive the floating piston directly in an emergency, actuating means connected to said last named piston and a forward stop for the floating piston so that it may in an emergency serve as a fixed partition.

10. In a hydraulic braking system a master cylinder having a single aligned bore of uniform diameter, a floating piston therein having a recess and having a projection formed thereon and dividing the cylinder into two chambers, one of which is connected to one brake and the other of which is connected to another brake, an actuating piston in said cylinder having a recess and having a projection which may contact the first named projection so that the actuating piston may drive the floating piston directly in an emergency, actuating means connected to said last named piston, a forward stop for the floating piston so that it may in an emergency serve as a fixed partition, and reservoir arranged to communicate at all times with said recesses.

11. In a hydraulic braking system a master cylinder having a single aligned bore of uniform diameter, a floating piston therein having a projection and dividing the cylinder into two chambers, one of which is connected to one brake and the other of which is connected to another brake, an actuating piston in said cylinder having a projection which may contact the first named projection so that the actuating piston may drive the floating piston directly in an emergency, actuating means connected to said last named piston, a forward stop for said floating piston so that it may in an emergency serve as a fixed partition, and springs for returning said pistons to a normal released position.

12. In a hydraulic braking system a master cylinder having a single aligned bore of uniform diameter, a floating piston therein having a projection and dividing the cylinder into two chambers, one of which is connected to one brake and the other of which is connected to another brake, an actuating piston in said cylinder having a projection which may contact the first named projection so that the actuating piston may drive the floating piston directly in an emergency, actuating means connected to said last named piston, a forward stop for said floating piston so that it may in an emergency serve as a fixed partition, springs for returning said pistons to a normal released position, and stops for limiting the return movement of said pistons.

13. A tandem master cylinder unit for actuating a plurality of independent hydraulic systems, comprising a cylinder barrel, a main piston and a floating piston both disposed therein, resilient means tending to return both of said pistons to their inoperative positions, said resilient means comprising a relatively light spring between the master piston and the floating piston and a stronger spring between said floating piston and one end of the cylinder barrel, and a mechanical connection between the master piston and the floating piston adapted to transmit only thrust and to become operative only when the total permissible construction in the working space between the master and floating pistons has taken place.

14. In a braking system, a master cylinder for actuating a plurality of independent hydraulic systems, a floating piston therein dividing the cylinder into two chambers, one of which is connected to one brake and the other of which is connected to another brake, an actuating piston operable in said cylinder for developing fluid pressure therein, mechanical means adapted to transmit only thrust between said actuating piston and said floating piston and operable only when a predetermined contraction in the working space between the actuating and floating pistons has taken place so that the floating piston may serve as an actuating piston in an emergency, means for stopping said floating piston after a predetermined contraction in the working space beyond the floating piston has taken place so that it may in an emergency serve as a fixed partition, and means for returning said pistons to a normal released position.

15. In a braking system, a master cylinder for actuating a plurality of independent hydraulic systems, a floating piston therein dividing the cylinder into two chambers, one of which is connected to one brake and the other of which is connected to another brake, separate reservoirs for supplying fluid to said chambers, an actuating piston operable in said cylinder for developing fluid pressure therein, mechanical means adapted to transmit only thrust between said actuating piston and said floating piston and operable only when a predetermined contraction in the working space between the actuating and floating pistons has taken place so that the floating piston may serve as an actuating piston in an emergency, means for stopping said floating piston after a predetermined contraction in the working space beyond the floating piston has taken place so that it may in an emergency serve as a fixed partition, and means for returning said pistons to a normal released position.

16. In a braking system, a master cylinder for actuating a plurality of independent hydraulic systems, a floating piston therein dividing the cylinder into two chambers, one of which is connected to one brake and the other of which is connected to another brake, a container for fluid disposed above said cylinder, a partition dividing said container into sepaarte reservoirs, separate fluid connections between said reservoirs and said chambers, an actuating piston operable in said cylinder for developing fluid pressure therein, mechanical means adapted to transmit only thrust between said actuating piston and said floating piston and operable only when a predetermined contraction in the working space between the actuating and floating pistons has taken place so that the floating piston may serve as an actuating piston in an emergency, means for stopping said floating piston after a predetermined contraction in the working space beyond the floating piston has taken place so that it may in an emergency serve as a fixed partition, and means for returning said pistons to a normal released position.

17. In a braking system, a master cylinder for actuating a plurality of independent hydraulic systems, a floating piston therein dividing the cylinder into two chambers, one of which is connected to one brake and the other of which is connected to another brake, an actuating piston operable in said cylinder for developing fluid pressure therein, mechanical means adapted to transmit only thrust between said actuating piston and said floating piston and operable only when a predetermined contraction in the working space between the actuating and floating pistons has taken place so that the floating piston may serve as an actuating piston in an emergency, means for stopping said floating piston after a predetermined contraction in the working space beyond the floating piston has taken place so that it may in an emergency serve as a fixed partition, and springs acting in opposite directions on said floating piston for returning said pistons to a normal released position, one of said springs being stronger than the other.

18. In a braking system, a master cylinder for actuating a plurality of independent hydraulic systems, an actuating piston operable in said cylinder for developing fluid pressure therein, a floating piston in said cylinder dividing said cylinder into two chambers, one chamber being between said actuating piston and said floating piston and the other chamber being ahead of said floating piston, one chamber being connected to one brake and the other chamber being connected to another brake, said floating piston having piston cups on each end thereof to prevent transmission of fluid from one chamber to the other, a reservoir for supplying fluid to said chambers, a passageway from said reservoir extending into said cylinder between said piston cups and another passageway from said reservoir extending into said cylinder immediately ahead of said floating piston when said floating piston is in its normal released position, mechanical means adapted to transmit only thrust between said actuating piston and said floating piston and operable only when a predetermined contraction in the working space between the actuating and floating pistons has taken place so that the floating piston may serve as an actuating piston in an emergency, means for stopping said floating piston after a predetermined contraction in the working space beyond the floating piston has taken place so that it may in an emergency serve as a fixed partition, and means for returning said pistons to normal released position.

WILLIAM C. SESSIONS.